United States Patent Office 3,217,013  
Patented Nov. 9, 1965

3,217,013  
N-ARALKYL DERIVATIVES OF 3,6-EPOXY-HEXAHYDROPHTHALIMIDE  
Earl R. Bockstahler, Indianapolis, Ind., assignor to The Dow Chemical Company, Midland, Mich., a corporation of Delaware  
No Drawing. Filed Aug. 1, 1962, Ser. No. 213,864  
8 Claims. (Cl. 260—326)

The invention relates to novel organic compounds and the preparation thereof, and more particularly relates to N-aralkyl derivatives of exo - cis - 3,6 - epoxyhexahydrophthalimide which may be represented by the following structural formula:

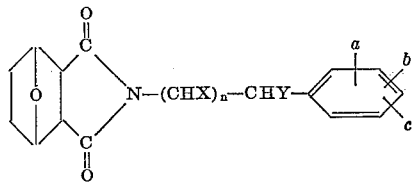

wherein  
$X = $ H or $CH_3$  
$n = $ 0, 1, 2 or 3  
$Y = $ H, $CH_3$, $C_2H_5$ or phenyl  
$a = $ H, Cl or OR  
$OR = $ lower alkoxy atoms having 1–4 atoms  
$b = $ H or Cl  
$c = $ H or Cl The present compounds are crystalline solids which are somewhat soluble in many common organic solvents and of rather low solubility in water. The compounds are adapted to be employed as active toxicants in compositions useful as vermicides for the control of a number of species of mites, insects and bacterial and nematode organisms, as well as for the control of a number of plant species. These compounds have also been found to serve as anticonvulsants in rats, and are, therefore, useful in the study of the effects of drugs on the nervous system in rats.

The compounds of the invention may be prepared by reacting the appropriate benzyl amine, phenylethyl amine, or other aralkyl amine with exo-cis-3,6-epoxyhexahydrophthalic acid, or the anhydride thereof. Reaction is brought about by heating the reactants either rapidly or slowly, as desired, to a reaction temperature in the range of about 125–300° C., more preferably to a temperature in the range of 170–225° C., and maintaining the reaction temperature until the cyclic imide forms. The amounts of the reactants to be employed are not critical, some product being formed regardless of the proportions used. Generally, equimolar amounts of the reactants are used, though a small excess of the amine, e.g., 10 percent by weight, may be employed if desired to assure reaction of substantially all the 3,6-epoxyhexahydrophthalic acid. Upon completion of the reaction, the reaction product may be purified by conventional procedures, such as washing, extraction and recrystallization. The following examples merely ilustrate the invention and are not to be construed as limiting.

*Example 1.—N-β-phenylethyl-3,6-epoxy-hexahydrophthalimide*

A mixture of 24.2 grams of β-phenylethylamine and 40.8 grams of 3,6-epoxyhexahydrophthalic acid monohydrate was heated gradually. The 3,6-epoxyhexahydrophthalic acid used, according to the work of Woodward and Baer, J. Am. Chem. Soc., 70, 1161 (1948), was in the exo-cis configuration, i.e., the carboxyl carbons both extend from the plane of the ring on the same side as the oxygen bridge. The mass became molten and water began to distill from the mixture. When the temperature of the mixture reached 185°, at which point approximately the theoretical amount (10.8 ml.) of water had distilled, heating was discontinued. The hot melt was poured cautiously into about 125 ml. of 95% alcohol. The resulting solution was stirred at boiling temperature with decolorizing carbon, filtered, and set aside. As it cooled, there formed a good crop of crystals of N-β-phenylethyl-3,6-epoxyhexahydrophthalimide, M.P. 101–102°, which was collected by filtration and air-dried.

*Example 2.—N-β-phenylethyl-3,6-epoxy-hexahydrophthalimide*

In a slightly different procedure, a mixture of 36.3 grams β-phenylethylamine and 50.4 grams of exo-cis-3,6-epoxyhexahydrophthalic anhydride was heated for three hours at 250° under an air condenser. The molten mass solidified on cooling and was recrystallized from aqueous alcohol to yield pure, crystalline N-β-phenylethyl-3,6-epoxyhexahydrophthalimide, M.P. 110–111°. This was the same substance as was obtained in Example 1, but in a different crystalline form. The higher melting form was obtained when the undiluted melt was allowed to solidify before recrystallization, the lower when the first crystals formed from alcohol solution. However, either form could be obtained at will from a supersaturated alcohol solution by seeding with crystals of the form desired.

By methods similar to Examples 1 and 2 using appropriately substituted benzyl amines, phenylethylamines and other aralkyl amines in place of N-β-phenylethylamine, there were prepared the following 3,6-epoxyhexahydrophthalimides:

| Amine Reactant | 3,6-Epoxyhexahydrophthalimide | M.P., °C. |
|---|---|---|
| Benzylamine | N-benzyl- | 114–115 |
| 2-chlorobenzylamine | N-2-chlorobenzyl- | 122–123 |
| 4-chlorobenzylamine | N-4-chlorobenzyl- | 110.5–111.5 |
| 4-methoxybenzylamine | N-4-methoxybenzyl- | 109–110 |
| 4-ethoxybenzylamine | N-4-ethoxybenzyl- | 118–119 |
| 2,4-dichlorobenzylamine | N-2,4-dichlorobenzyl- | 144–145 |
| 3,4-dichlorobenzylamine | N-3,4-dichlorobenzyl- | 122–123 |
| β-2-chlorophenylethylamine | N-β-2-chlorophenylethyl- | 83–83 |
| β-2,4-dichlorophenylethylamine | N-β-2,4-dichlorophenylethyl- | 124–126 |
| β-4-chlorophenylethlyamine | N-β-4-chlorophenylethyl- | 143–145 |
| 4-n-butoxybenzylamine | N-4-n-butoxybenzyl- | 88–89 |
| 4-phenylbutylamine | N-4-phenylbutyl- | 99.5–100.5 |
| Diphenylmethylamine | N-diphenylmethyl- | 137–139 |
| α-methyl-β-phenylethylamine | N-α-methyl-β-phenylethyl. | 69–71 |
| β-phenylbutylamine | N-β-phenylbutyl- | 92–93 |
| α-methylbenzylamine | N-α-methylbenzyl- | 86–87 |
| β-methyl-β-phenylethylamine | N-β-methyl-β-phenylethyl- | 81–83 |

Especially useful groups of the present compounds include the N-chlorobenzyl, the N-chlorophenylethyl and the N-alkoxybenzyl derivatives, wherein the chlorine substituted groups include mono, di and trichloro substitution.

The compounds of the present invention are useful for the control of various plant and animal infesting pests, as well as for the control of various bacterial organisms. While all the compounds of the invention exhibit the activities named herein, they do not all exhibit each activity to the same degree. Therefore, for any given use, some of these compounds are to be more preferred than others.

In a representative operation for the control of insects, test compound was applied at the rate of 29 pounds per acre to a soil-vermiculite mixture containing cotton seeds. Following germination (1 week after soil treatment), the plants were exposed to heavy population pressures of the cotton leaf perforator. Both exo-cis-N-4-chlorophenylethyl-3,6-epoxyhexahydrophthalimide and exo-cis - N - β-methyl-β - phenylethyl - 3,6 - epoxyhexahydrophthalimide gave complete, immediate control of the cotton leaf perforator.

In preparing a toxicant composition containing one of the compounds of the present invention, the compound may be dispersed in water with or without the aid of a surface active agent and employed as a spray. The compound may be prepared as an active constituent in a solvent solution, oil-in-water or water-in-oil emulsion, or as an aqueous dispersion. If desired, the compounds may be used in formulating a composition comprising a carrier dust, e.g., of wood flour, or in making a composition comprising a wettable powder. Typical aqueous dispersions of the compounds contain from 5 parts per million to 1 percent by weight of the compound.

The exo-cis-3,6-epoxyhexahydrophthalic acid employed as a starting material in accordance with the present teachings may be prepared, according to known procedures, by the reaction of furan with maleic anhydride. The adduct formed is illustrated by the following structural formula:

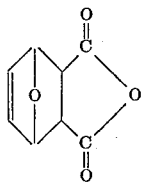

The so-formed adduct is converted to a sodium salt and hydrogenated to the hexahydro form, being then isolated as the dicarboxylic acid hydrate having the following structural formula:

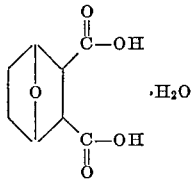

The anhydride illustrated below may then be obtained, if desired, by distilling the foregoing acid hydrate under reduced pressure.

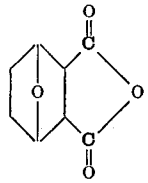

I claim:

1. Exo-cis-N-aralkyl-3,6 - epoxyhexahydrophthalimide wherein the aralkyl substituent is selected from the group consisting of mono-alkoxy-benzyl having from 1 to 4 carbons in the alkoxy group, monochlorobenzyl, dichlororobenzyl, monochlorophenylethyl and dichlorophenylethyl.

2. Exo-cis-N-chlorobenzyl - 3,6 - epoxyhexahydrophthalimide.

3. Exo-cis-N-chlorophenylethyl - 3,6 - epoxyhexahydrophthalimide.

4. Exo - cis - N - alkoxybenzyl - 3,6 - epoxyhexahydrophthalimide, wherein the alkoxy group is of 1 to 4 carbon atoms.

5. Exo-cis-N-4 - chlorobenzyl - 3,6 - epoxyhexahydrophthalimide.

6. Exo-cis-N-4-methoxybenzyl - 3,6 - epoxyhexahydrophthalimide.

7. Exo-cis-N-4-chlorophenylethyl - 3,6 - epoxyhexahydrophthalimide.

8. Exo-cis-N-2-chlorophenylethyl - 3,6 - epoxyhexahydrophthalimide.

References Cited by the Examiner
UNITED STATES PATENTS

| | | | |
|---|---|---|---|
| 2,524,145 | 10/50 | Tawney | 260—326 |
| 2,545,283 | 3/51 | Johnson | 260—326 |
| 2,900,243 | 8/59 | Lewis | 260—326 |

OTHER REFERENCES

Polivet, Ann. Chim. (Paris), vol. 5, pages 1200–1211 (1960).

Kragt et al., Zuhr. Obschei. Khim., volume 26, pages 213–218 (1956).

NICHOLAS S. RIZZO, *Primary Examiner.*

IRVING MARCUS, *Examiner.*